March 25, 1930. E. SANDNER 1,751,496
TORQUE CUSHIONING SHAFT COUPLING
Filed July 28, 1927
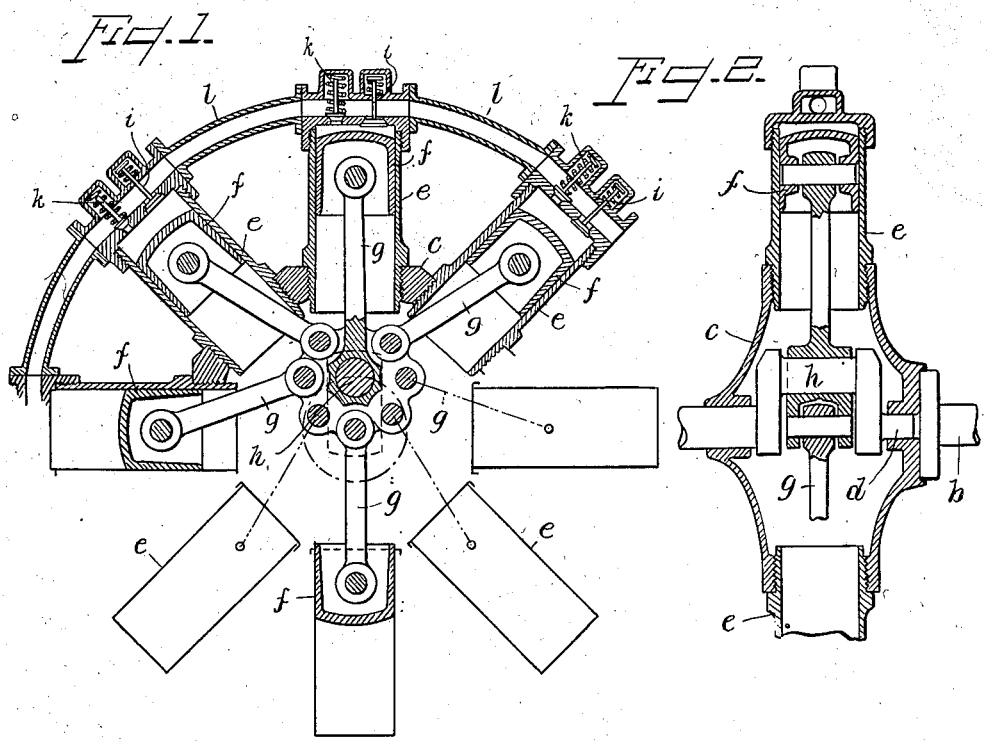
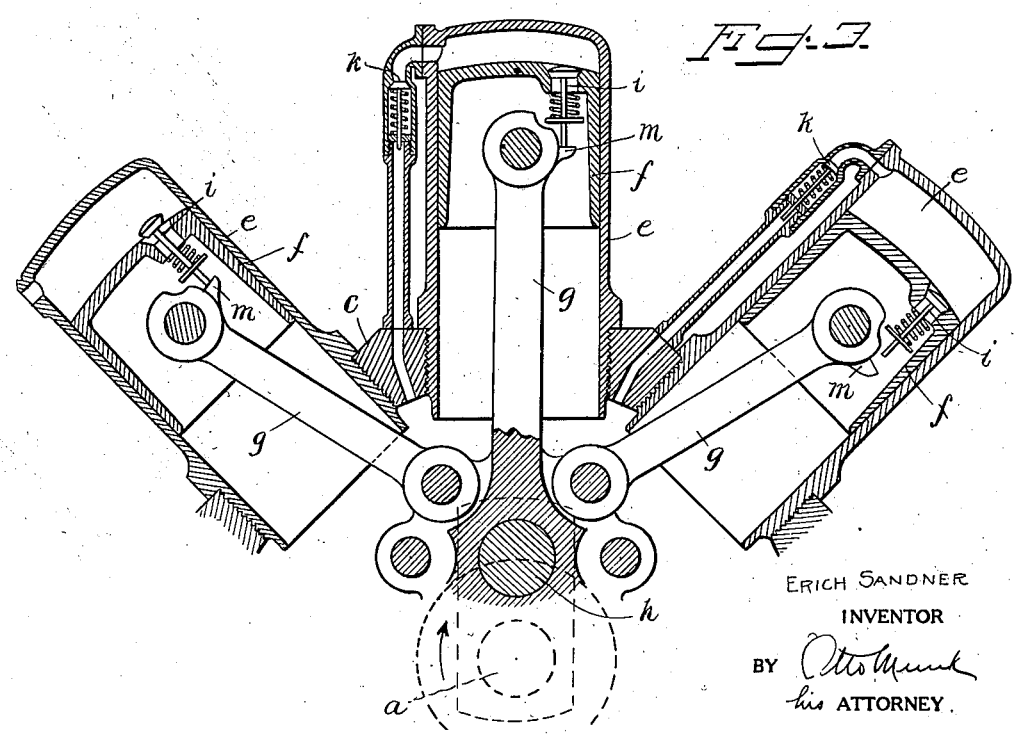
ERICH SANDNER
INVENTOR
BY
his ATTORNEY.

Patented Mar. 25, 1930

1,751,496

UNITED STATES PATENT OFFICE

ERICH SANDNER, OF KOBE, JAPAN

TORQUE CUSHIONING SHAFT COUPLING

Application filed July 28, 1927, Serial No. 209,031, and in Germany April 21, 1925.

Whenever a shaft on which two or more masses are fastened is rotating, there exists a possibility that these masses will oscillate against each other with a natural number of oscillations per minute which depends partly on the moment of inertia of the masses, partly on the elastic conditions of the shaft between the masses. If such a shaft is made to rotate with a number of revolutions in a certain relation to the natural frequency of oscillations, it is running at a so-called critical speed in which the masses, when excited by some impulse on the shaft, will swing against one another so that additional torsional stresses will occur in the intermediate parts of the shaft; these stresses attain their maximum in the node of the particular torsional vibration and they are liable to become strong enough to cause a fracture of the shaft when running frequently within the range of such a critical speed. It is by no means conditional that the masses are mounted on an undivided shaft; even if some coupling or a toothed gear or the like is placed between the masses, the critical vibrations will develop in a similar manner.

It is known that the heavy stresses in shafts resulting either from large accelerating forces or from torsional oscillations in critical ranges can be lessened by arranging a friction coupling at a suitable place in the shaft, this friction coupling being only moderately tightened so that it begins to slip as soon as the turning moment exceeds a certain limit; such slipping couplings are used, for instance, for driving auxiliary dynamos on aeroplane engines. However, such simple friction couplings cannot be applied for the transmission of larger forces, because, on the one hand, the turning moment at which the coupling begins to slip is liable to vary undesirably within wide limits according to the state of the sliding surfaces of the coupling and because, on the other hand, the slipping surfaces will be ruined in a short time owing to the large forces and the high frequency which are to be dealt with in most cases.

Another known method to overcome the detrimental effects of critical speeds, particularly in long shafts, consists in subdividing the shaft and placing a hydraulic energy transformer between the two parts of the shaft; with such a transformer, there is no solid connection between the two shafts, but the power can be transmitted only by some difference in the rotating speed of the driving shaft against the driven part of the shaft, in other words, a certain slipping must always be counted with even outside the critical ranges. It is well known that a torsional oscillation of the masses fixed on the one part of the shaft against the masses fixed on the other part of the shaft cannot develop if the two parts are separated by such a hydraulic transformer; there exist now, rather, two entirely independent shaft systems each of which will have its own natural number of oscillations; the latter will, at any rate, be located higher than the natural frequency of the entire shaft when rigidly coupled which may be of advantage in many cases. The great drawback of putting this appliance into practical use is the fact that a permanent loss of power, amounting to several per cent due to the constant slipping, has to be put up with and that the dimensions of the transformers, especially for slow running shafts, become very large if the loss of slipping is to be kept within moderate limits. Besides, in many cases, conditions are such that even with the interposition of a hydraulic transformer, the one or the other part of the shafting may have dangerous critical ranges of its own lying within the working range of the shaft.

It is the aim of the present invention, for which I have filed an application in Germany, April 21, 1925, to produce a connection of the ends of a subdivided shafting which, similar to an ordinary friction coupling, can be considered as a rigid connection outside the critical ranges, so that no loss of power will occur under usual running conditions, while in critical ranges the device will be able to slip as soon as a certain precisely predetermined turning moment is exceeded, the device being of such design that it can slip under any amount of force without creating undue heating, ruining of sliding surfaces or other detrimental effect.

According to the invention the shaft is divided between the masses in two (or more) parts as near as possible in the node (or in the nodes) of the torsional oscillations and the ends are coupled together by means of a hydraulic coupling which in its design and function is similar to a rotating, positive acting water (or oil) pump the delivery valves of which are so loaded (for instance by springs) that they cannot open unless a certain pressure is exceeded which is somewhat higher than the pressure necessary for transmitting the maximum turning moment liable to arise except in the range of torsional vibrations, so that this coupling is like a rigid connection outside of critical ranges. In case the hydraulic coupling is designed as a piston pump, the suction valves may be actuated mechanically. In the accompanying drawings, Figure 1 is a cross-sectional view of a device constructed in accordance with my present invention, certain portions of this figure being shown diagrammatically;

Figure 2 is a cross-sectional view taken substantially through the vertical center of Figure 1; and Figure 3 is a fragmentary cross-sectional view similar to Figure 1 and showing a modified type of device.

Referring to Figures 1 and 2, $a$ and $b$ represent the shaft sections of a shaft device subjected to a pulsating torque, and it may be assumed that the turning moment is to be transmitted from shaft —$a$— to shaft —$b$—, but it is immaterial for the desired effect of the device as to whether the transmission of the force takes place from —$a$— to —$b$— or vice versa. The shaft —$a$— is provided with a crank and is pivoted by means of the fulcrum pin —$d$— in the casing —$c$— so that shaft —$a$—can revolve in casing —$c$— while shaft —$b$— is rigidly flanged together with the casing. Several cylinders —$e$— are arranged radially in the casing —$c$—; the pistons —$f$— are coupled in approved fashion by means of connecting rods —$g$— to the crank pin —$h$— common to all cylinders. There are two valves in each cylinder cover, an automatic inlet valve —$i$— and a spring-loaded delivery valve —$k$—. As will be noted from Figure 1, the cylinder covers contain a common suction and delivery chamber, all these chambers being interconnected which is indicated by the intermediate pipes —$l$—. The space between the pistons and the cylinder covers as well as the chambers in the cylinder covers and the intermediate piping are supposed to be completely filled with some liquid (for instance lubricating oil) and the springs of the delivery valves —$k$— are tightened to such extent that the valves can open only at a piston pressure higher than that corresponding to the largest turning moment to be transmitted under usual running conditions. Under these circumstances the pistons, when shaft —$a$— is made to rotate, will force the cylinders (and consequently the shaft —$b$—) to partake in the rotation until the turning moment exceeds a certain maximum amount which is precisely determined by the tension of the springs of the delivery valves, so that the shafts —$a$— and —$b$— are, practically speaking, rigidly coupled up to this maximum turning moment; hence, this state of rigid connection between the shafts is going to be maintained as long as no additional, undesired forces will supervene. If one or more masses are fixed on each of the shafts —$a$— and —$b$—, these will oscillate against each other when the shaft is running in, or passing through critical ranges so that at each swinging opposite to the direction of rotation of the shaft an additional force is created which is liable to overcome the largest possible piston pressure; in such a case the delivery valves will react by allowing a certain amount of liquid to pass out of the compression chamber of those pistons which happen to be on the outward stroke while the other pistons will suck in an equivalent amount of liquid; the pistons (and, therefore, shaft —$a$—) will thereby advance a little in relation to the cylinders (and, therefore, shaft —$b$—). By such slipping the shaft will never be subjected to a larger strain than desired but the torsional oscillations, which are still apt to take place within the ranges of critical speeds, are much dampened and cannot develop to their full extent. It is obvious that a low pressure (for instance atmospheric pressure) must prevail in the reservoir of the liquid which is formed by the connecting pipes —$l$— and the chambers in the cylinder heads, that this low pressure is kept as constant as possible and that provision must be made to replenish constantly whatever liquid may be lost by leakage.

The device shown by Figures 1 and 2 will act in the same manner in both directions of rotation. In Figure 3 another example is shown that can be used only in one direction; Figure 3 is a cross-section through the device analogous to Figure 1; only a few of the cylinders are drawn in Figure 3 in a somewhat larger scale; the same letters indicate the same parts as in Figures 1 and 2. With this design the suction valve —$i$— is situated in the piston and is actuated by means of a tappet —$m$— on the connecting rod —$g$—. This method of arranging and actuating the suction valves is, however, no special feature of this device, the suction valves may just as well be placed in the cylinder covers and may be driven by any gear from the shaft or in any other convenient manner. The delivery valve is put laterally on the cylinders and the liquid, when forced out through the delivery valves, is conducted into the hermetically closed crank chamber, it being supposed that the interior of the casing as well as the cylinder chambers have previously been filled with the liquid. With this design the crank chamber forms, therefore, the reservoir for the liquid similar to the cylinder covers and connecting piping —*l*— in Figure 1, but in both cases it is immaterial for the function of the device in which mode the valves and the reservoir are arranged. Presuming that crank pin —*h*— is again part of shaft —*a*— (as shown in Figure 2) and that the crank pin is rotating in the direction indicated by an arrow in Figure 3, the pistons will be coupled with the cylinders in exactly the same manner as with the device according to Figures 1 and 2. If a torsional oscillation should occur with the effect that the driving part of the shaft is endeavouring to retard or the driven part of the shaft to advance, the cylinders (which are rigidly flanged onto shaft —*b*—) will advance in relation to the pistons without any noticeable reistance, because the inlet valves —*i*— in the cylinders in which the pistons are now moving outwardly are mechanically kept open by the tappets —*m*— as is evident on the left cylinder in Figure 3; the inlet valves in the other cylinders are acting as automatic suction valves so that none of the pistons will meet with any resistance worth mentioning; contrary to the device previously described, with an arrangement according to Figure 3, no force can come into effect on the driving shaft opposite to the direction of rotation, which is in many cases of great advantage, but the latter device can be solely employed in such installations where the shaft is to rotate in only one direction.

What I claim as my invention is:—

1. A shaft device adapted to be subjected to a pulsating torque, said device comprising separate shaft sections terminating in mutual adjacence at the nodes of torsional oscillation of the device, and coupling for said sections, said coupling comprising a set of positive-action hydraulic pumps, the latter comprising complementary pumping members carried by said sections respectively, and automatically operable means for normally preventing relative movement of said pumping members and hence of said sections, and for allowing such relative movement when resonance between shaft device and pulsations sets up torsional stresses at said nodes greater than a predetermined maximum.

2. A shaft device adapted to be subjected to a pulsating torque, said device comprising separate shaft sections terminating in mutual adjacence at the nodes of torsional oscillation of the device, and a coupling for said sections, said coupling comprising a set of positive-action hydraulic pumps, the latter comprising complementary pumping members carried by said sections respectively, and means for preventing relative movement of said pumping members and hence of said sections except when resonance between shaft device and pulsations sets up torsional stresses at said nodes greater than a predetermined maximum; said means comprising outlet valves for said pumps, and a spring associated with each outlet valve to hold the same closed except under a predetermined hydraulic pressure.

3. A shaft device adapted to be subjected to a pulsating torque, said device comprising separate shaft sections terminating in mutual adjacence at the nodes of torsional oscillation of the device, and a coupling for said sections, said coupling comprising a set of positive-action hydraulic pumps, the latter comprising complementary hydraulic cylinders and pistons carried by said sections respectively, and automatically operable means for normally preventing relative movement of said pistons and cylinders and hence of said sections, and for allowing such relative movement when resonance between shaft device and pulsations sets up torsional stresses at said nodes greater than a predetermined maximum.

4. A shaft device adapted to be subjected to a pulsating torque, said device comprising separate shaft sections terminating in mutual adjacence at the nodes of torsional oscillation of the device, and a coupling for said sections, said coupling comprising a set of positive-action hydraulic pumps, the latter comprising complementary hydraulic cylinders and pistons carried by said sections respectively, and means for preventing relative movement of said pistons and cylinders and hence of said sections except when resonance between shaft device and pulsations sets up torsional stresses at said nodes greater than a predetermined maximum; said means comprising spring-loaded outlet valves associated with said pumps; an inlet valve associated with each pump, and means for mechanically retaining the inlet valves open during suction strokes of the pistons.

In testimony whereof I hereunto affix my signature.

ERICH SANDNER.